United States Patent [19]

Kent et al.

[11] 4,268,284
[45] May 19, 1981

[54] MULTICHANNEL PARTICLE SEPARATOR OF THE ANTI-ICING TYPE

[75] Inventors: Peter Kent; Richard M. Norris, both of Stratford, Conn.; Alan J. Charlton, Boxford, Mass.

[73] Assignee: Avco Corporation, Stratford, Conn.

[21] Appl. No.: 32,604

[22] Filed: Apr. 23, 1979

Related U.S. Application Data

[63] Continuation of Ser. No. 849,239, Nov. 7, 1977, abandoned, which is a continuation-in-part of Ser. No. 692,654, Jun. 4, 1976, abandoned.

[51] Int. Cl.³ .............................................. B01D 45/16
[52] U.S. Cl. ........................................ 55/269; 55/431; 55/440; 60/39.09 P; 60/39.09 D; 165/170
[58] Field of Search .................. 55/261, 267, 269, 306, 55/440, 431; 60/39.09 P, 39.09 D; 165/170

[56] References Cited

U.S. PATENT DOCUMENTS

| | | | |
|---|---|---|---|
| 960,374 | 6/1910 | Muchka | 55/440 X |
| 1,362,251 | 12/1920 | Kellogg | 55/269 |
| 2,143,979 | 1/1939 | Feinberg | 55/440 X |
| 3,212,241 | 10/1965 | Worthen et al. | 55/444 |
| 3,224,175 | 12/1965 | Beach | 55/440 |
| 3,246,689 | 4/1966 | Remde et al. | 165/170 X |
| 3,274,797 | 9/1966 | Kritzer | 165/170 X |
| 3,289,398 | 12/1966 | McIlvaine | 55/440 |
| 3,815,336 | 6/1974 | Rigo | 55/269 |
| 3,970,439 | 7/1976 | Murphy | 55/385 B X |
| 3,978,656 | 9/1976 | Murphy | 55/306 X |

FOREIGN PATENT DOCUMENTS

| | | | |
|---|---|---|---|
| 2433150 | 2/1975 | Fed. Rep. of Germany | 55/269 |
| 1431 | of 1877 | United Kingdom | 55/269 |
| 402075 | 11/1933 | United Kingdom | 55/269 |
| 295571 | 2/1971 | U.S.S.R. | 55/269 |
| 363633 | 12/1972 | U.S.S.R. | 55/269 |

*Primary Examiner*—Kathleen J. Prunner
*Attorney, Agent, or Firm*—Ralph D. Gelling

[57] ABSTRACT

A multichannel particle separator for use in cleaning engine inlet air is disclosed. The separator uses a plurality of channel assemblies arranged in parallel side-by-side fashion within a substantially rectangular housing. Separation of undesired particles is achieved by accelerating the incoming airstream to a high velocity and turning it such that inertia carries the dirt particles into a particle collection chamber. A small percentage of the incoming air is used to induce particulate matter to proceed into the particle collection chambers. Heated air from a source within the adjacent engine is passed along passages within the interior of each channel assembly to heat the surface thereof and prevent ice formation thereon when operating under adverse meteorological conditions. The small percentage of diverted incoming air and the spent hot air are combined in the particle collection chambers to form a turbulence generator which maintains the separated particulates and collected moisture in suspension for exhaustion overboard through a common scavenge manifold.

4 Claims, 10 Drawing Figures

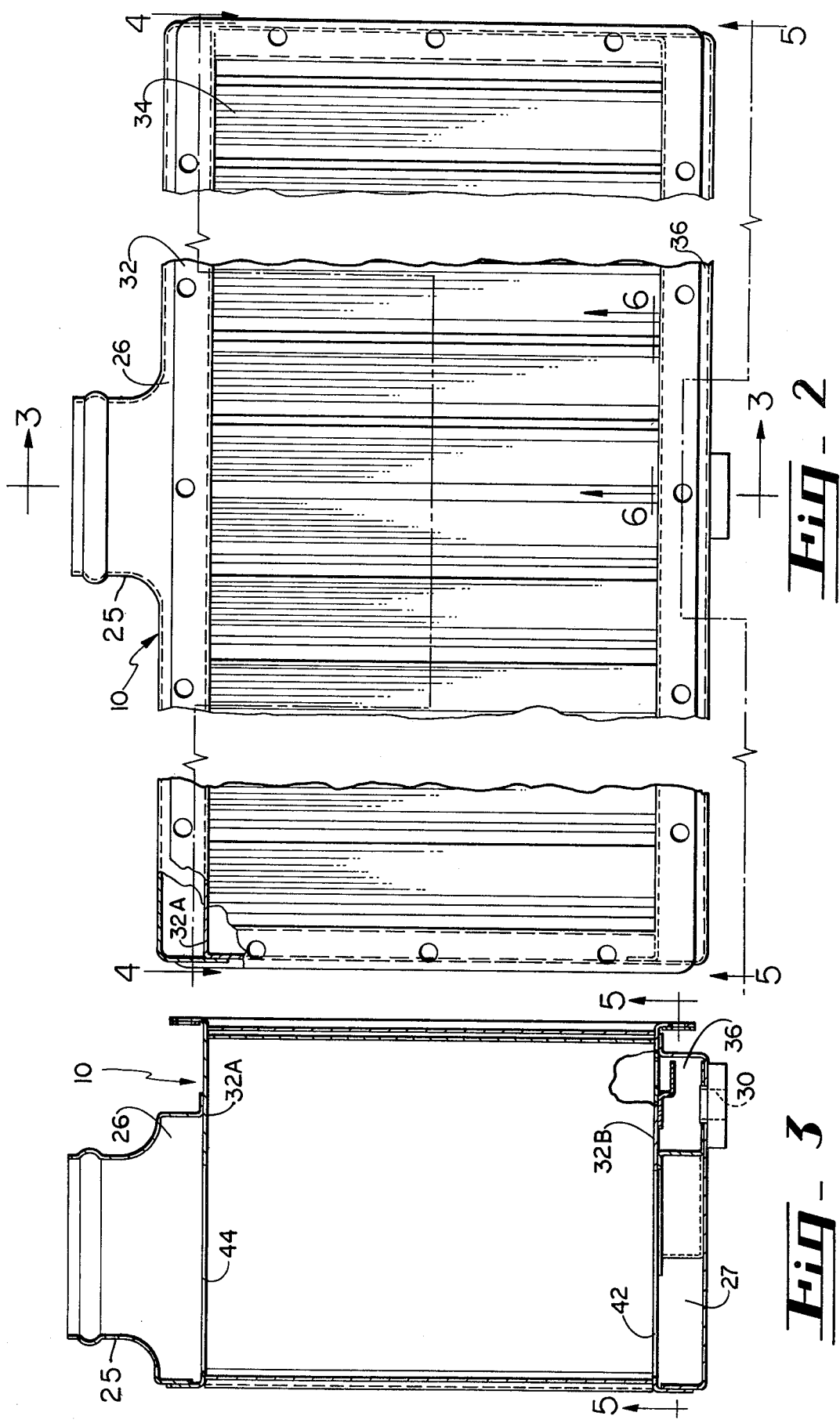

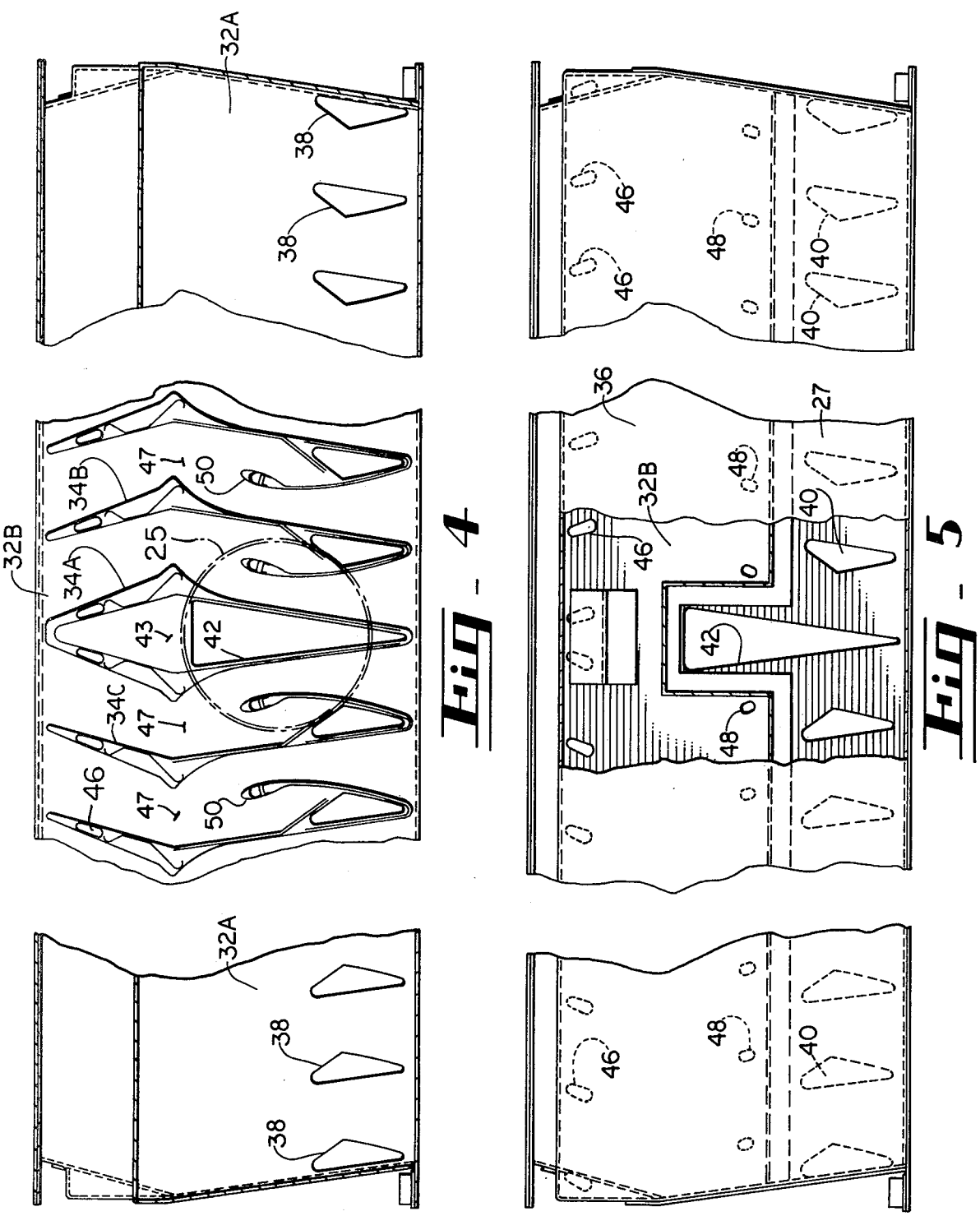

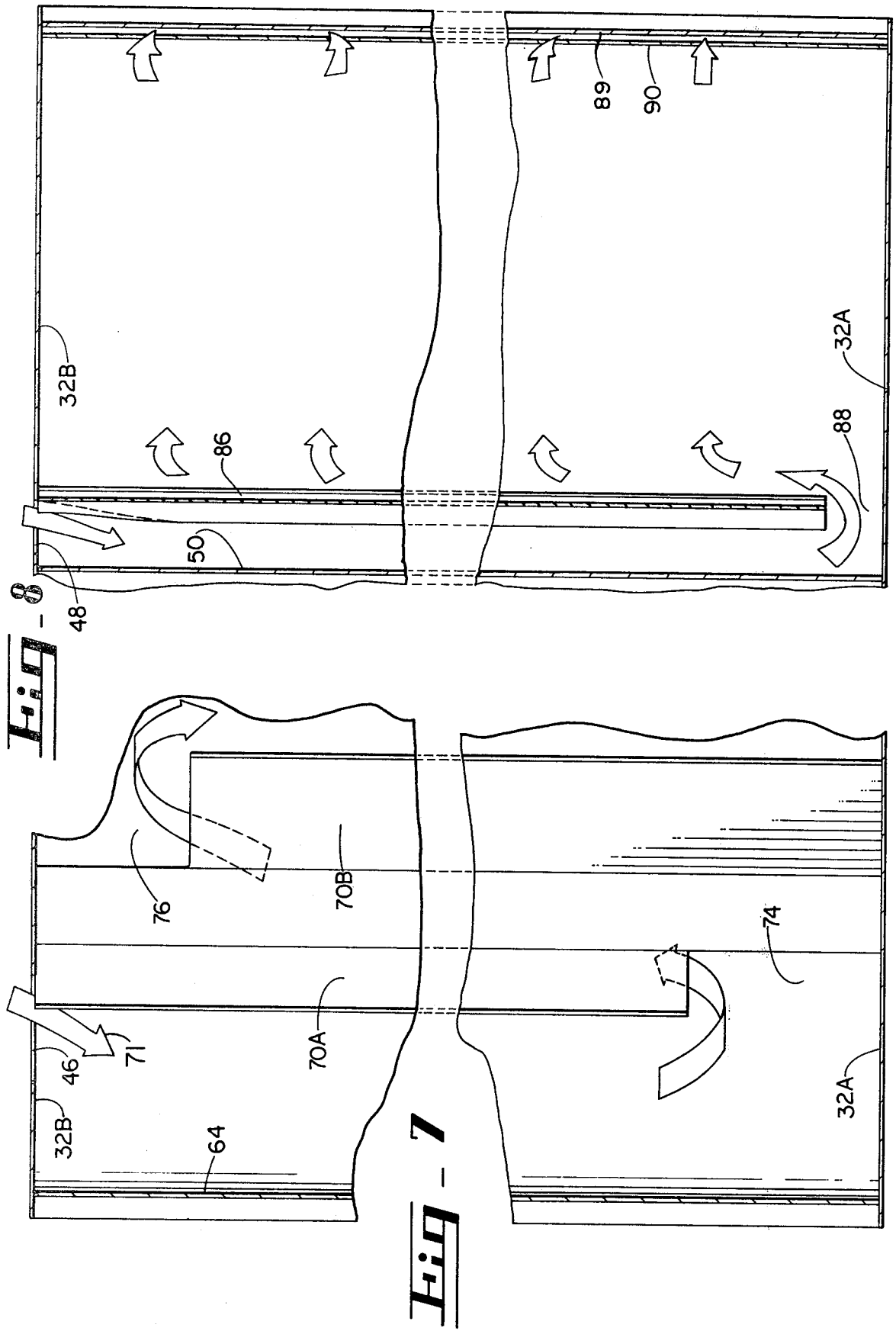

MULTICHANNEL PARTICLE SEPARATOR OF THE ANTI-ICING TYPE

This is a continuation of copending application Ser. No. 849,239 filed Nov. 7, 1977, now abandoned, which was a continuation-in-part of then copending application Ser. No. 692,654, filed June 4, 1976, now abandoned.

BACKGROUND OF THE INVENTION

This invention relates generally to improvements in particle separators and more specifically to means for providing an anti-icing capability thereto. Many sand and dust separators have been developed over the last fifteen years to protect internal combusion engines which operate in sand-laden environments. The U.S. Pat. No. (3,970,439) of Murphy assigned to Avco Corporation, assignee of the present invention, is an example of the current state of the art. Other examples of sand and dust separators are disclosed in United States Patents as follows: U.S. Pat. No. 1,693,479 of Edgar; U.S. Pat. No. 3,371,471 and U.S. Pat. No. 3,534,548 of Conners; U.S. Pat. No. 3,673,771 of Dickey; U.S. Pat. No. 3,720,045 of Murphy; and U.S. Pat. No. 3,778,983 of Rygg. Additional examples of separators are covered in British Pat. No. 446,268; French Pat. No. 769,259 and German Pat. No. 543,466.

All of the abovementioned air particle separators provide protection from the erosion damage caused when sand and dust get into the air intake of an engine. None, however, has the anti-icing capability provided by our invention. The particle separator herein described is both small and efficient in that it removes contaminants without a large pressure drop across the assembly. Further, when temperature and humidity conditions are such that frost and ice would begin to build up on the plurality of parts making up the separator assembly, heated air is fed through ducts to rid the surfaces of ice. With this invention residual ice can be melted and the resulting liquid withdrawn through the scavenge ducts. Initiation of the flow of heated air can wait until ice-up commences.

SUMMARY OF THE INVENTION

This invention provides an improved ice-free type of separator for removing sand and dust from the stream of incoming air supplied to an engine. The separator comprises a plurality of identical tortuous passage channel assemblies arranged side-by-side in a substantially rectangular housing configuration much as was disclosed by Murphy in U.S. Pat. No. 3,970,439 which is assigned to Avco Corporation, assignee of the present invention. In the same manner as was disclosed by Murphy, separation of foreign particles is achieved by acceleration of the incoming stream of air to a high velocity and then turning the airstream such that inertia carries the heavier particles into a capture area. The entrapped particles are retained in the capture area in a state of suspension for later disposal through a common scavenge manifold.

The invention improves on the disclosure of Murphy in that a de-icing capability is added to assure that the separator remains functional under all conditions of temperature and humidity. De-icing is accomplished by ducting a source of hot air from within the adjacent engine into and throughout the interior of each of the channel separator assemblies. The spent hot air is discharged into the particle capture areas along with a small fraction of the cold air being drawn into each of the particle collector chambers of the separator.

The heating effect of the flow of hot air serves to keep the various exterior surfaces free of ice. Discharge of the spent hot air through the scavenge manifold both shelters the hot air ducts from impinging water and also prevents flow blockage should the operator not turn on the anti-icing equipment until after icing conditions are encountered.

A further feature of the invention is to provide a particle separator having a substantially flat panel configuration which enables the shape of the outlet side of the separator to be contoured to fit the engine with which the separator is to be used.

Other objects, use and advantages of this invention will become apparent from the following description and the accompanying drawings.

BRIEF DESCRIPTION OF THE DRAWINGS

The objects and features of the invention may be better understood from the following detailed discussion taken in conjunction with the accompanying drawings in which:

FIG. 2 is a top view of the particle separator;

FIG. 3 is a cross sectional view taken along line 3—3 at the middle of FIG. 2;

FIG. 4 is a left hand end view, partially cut away, of the particle separator taken along line 4—4 of FIG. 2;

FIG. 5 is a right hand end view, partially cut away, of the particle separator taken along line 5—5 of FIG. 2;

FIG. 7 shows the flow path taken by the heated air injected within the interior of the inlet portion of the channel assembly as taken along line 7—7 of FIG. 6;

FIG. 8 shows the flow path taken by heated air injected within the interior of the outlet portion of the channel assembly as taken along line 8—8 of FIG. 6;

DESCRIPTION OF THE ILLUSTRATED EMBODIMENT

Figure 1:
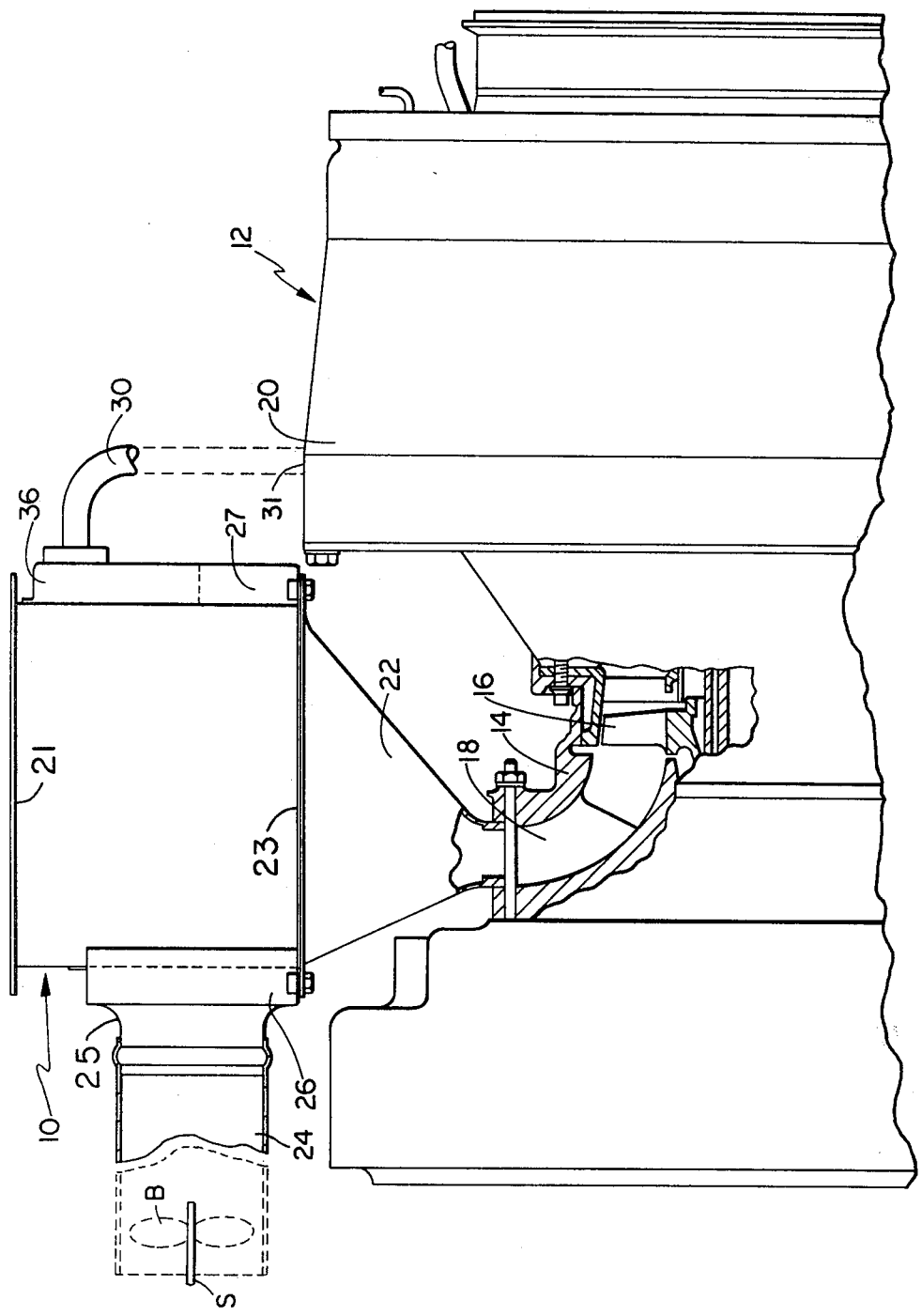
FIG. 1 is a fragmentary side view, partially broken away, of an exemplary gas turbine engine on which the particle separator of the invention is mounted.

Reference is not made to FIG. 1 which illustrates a particle separator 10 used in association with a gas turbine engine 12. Separator 10 is secured by suitable means on gas turbine engine 12 adjacent the compressor module 14 of the engine. Module 14 includes a compressor stage 16 and engine air-inlet ducting 18. The output of the compressor stage 16 serves as the input to the combustor/power module 20 of the engine.

Dirt laden air enters the separator 10 at inlet 21. Clean air is discharged from outlet 23 into scroll 22. Scroll 22 connects separator 10 with inlet ducting 18 so that only dirt free air enters the engine compressor. Dirt taken from the air stream entering particle separator 10 is drawn through exhaust duct 24 which is in communication both with scavenge manifold 26 and with manifold 27 via a crossover passage (Shown in cross sectional view in FIG. 3). Exhaust duct 24 has aerodynamically mounted therein a blower B. The latter is rotated by a shaft S which is mechanically powered as by a motor not shown. Thus, a reduced pressure is maintained in manifolds 26 and 27 to draw particulate matter from particle separator 10.

Referring now to FIGS. 2 and 3, the separator 10 has a housing 32 having a substantially rectangular configuration. Mounted within housing 32 and between sidewalls 32a and 32b are a plurality of inlet-to-outlet and sidewall-to-sidewall extending channel assemblies 34. Channel assemblies 34 define a plurality of inlet air passageways within the housing 32.

Figure 6:
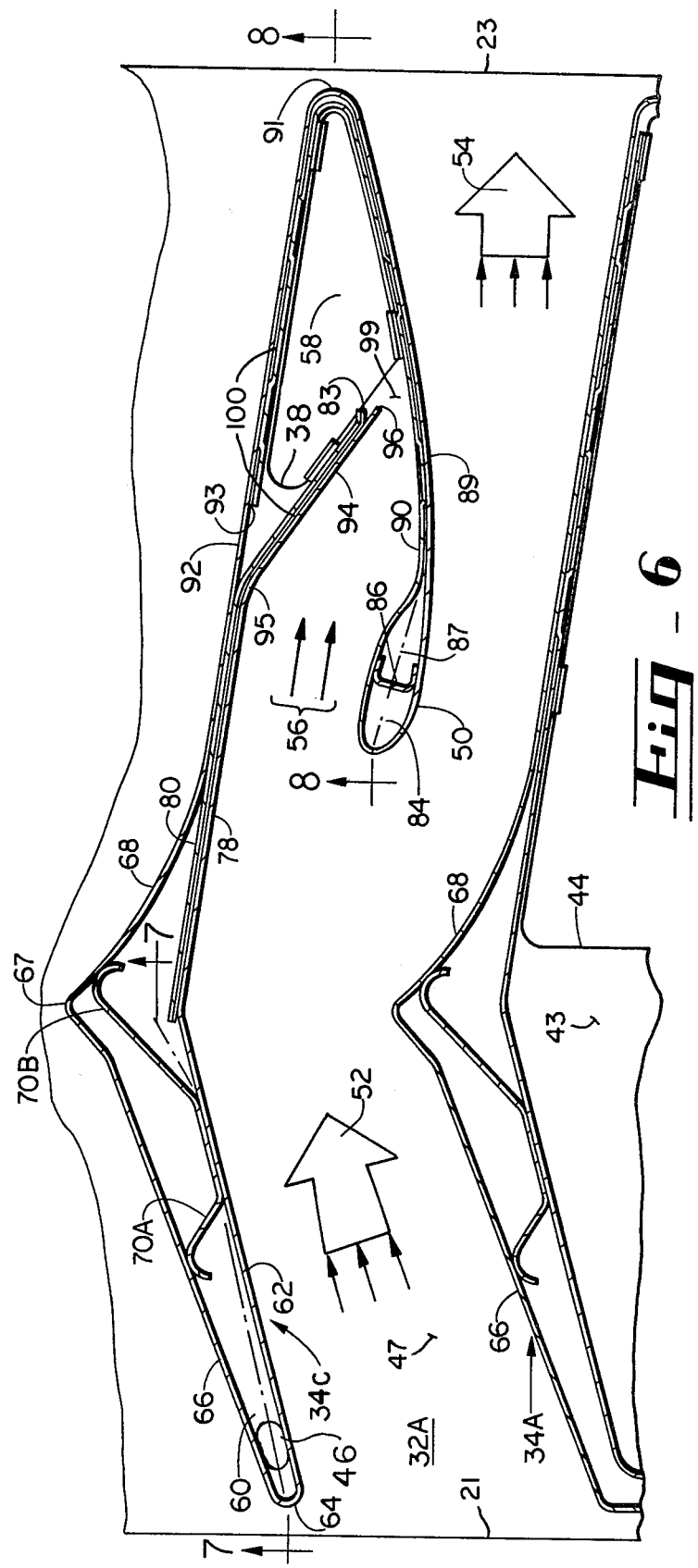
FIG. 6 is a cross sectional view of two adjacent channel assemblies taken along line 6—6 of FIG. 2 showing the details of construction and the placement of baffles within each channel.

The channel assemblies 34 are shown in FIGS. 4 and 6 and are constructed with a hollow leading edge 64 which serves to divide the inlet airflow so that it flows along passageways 47 formed between adjacent channel assemblies 34a, 34b, etc. Each channel assembly 34 is constructed so that each passageway 47 includes a direction changing turn midway through the passageway to create a deflection of the airflow so that the particles of higher inertia, i.e., the contaminants, are forced to the outside of the turn. The outlet end 91 of each 34a and 34c channel assembly is extended and bent forward in a hook shaped extension formed by wall 89, said extension having leading edge 50 extending into the passageway 47 to divide airflow 52 just downstream of the direction changing turn. The hook-like shape of the extension formed by wall 89 defines a particle collection chamber 58 into which the particles of higher inertia are collected. The leading edges 64 and 50 which extend into the airstream 52 are constructed with interior hollow cavities 60 and 84 and include small ducts 100 formed in the walls of the channel assemblies 34 which connect the interior cavities 60 and 84 with the particle collection chamber 58. Hot engine air, which may be bled in a well-known manner through duct 30, is distributed through intake manifold 36 and ports 46 and 48 to the interior cavities 60 and 84. The hot air is distributed throughout the interior of each channel assembly 34 flowing through cavities 60 and 84 along the small ducts 100 which provide heating of all exterior surfaces. Finally, after transferring most of its heat energy to the walls of the channel assembly 34, the once hot air is exhausted into the particle collection chamber 58 from outlets 83 and 93 of ducts 100.

FIG. 4 shows the arrangement of channel assemblies 34 in more detail. One channel assembly 34a is the centrally positioned unit which serves as a vane reverser. The vane reversing assembly 34a results from taking half of a left facing channel assembly and joining it top and bottom to half of a right facing channel assembly. The multiplicity of channel assemblies 34b (on the right in FIG. 4) are all alike, each being spaced at regular intervals from its neighbors. Channel assemblies 34c are mirror images of the 34b assemblies. Each of the 34a, 34b and 34c assemblies are composite structures having layered walls which may be formed of any suitable heat conductive material such as sheet steel or the like. Collected dirt particles, separated from the entering airstream 52 by the channel assemblies 34a, b, c, pass from the housing sidewalls 32a and 32b to the scavenge manifold 26 through ports 38 in sidewall 32a (see FIG. 4). Scavenge manifold 26 is mounted on sidewall 32a of the housing (see FIGS. 2 and 3.

A supplementary scavenge manifold 27 collects dirt particles from the opposite end of the channel assemblies 34. As seen in FIG. 5, ports 40 formed in sidewall 32b allow scavenge manifold 27 to communicate with the dirt collecting chambers 58 of all of the channel assemblies 34. A cross-over passage 43 down the center of channel assembly 34a provides communication from manifold 27 to manifold 26 via sidewall port 42 in wall 32b and port 44 in wall 32a. (See also FIG. 3). Flanged collar 25 allows attachment of exhaust duct 24 to manifold 26 (See FIGS. 1 and 3).

Hot gas to provide the anti-icing is supplied to the channel assemblies 34 via intake manifold 36 (See FIGS. 1, 3 and 5). A series of ports 46 allow an equal amount of heated air to flow through sidewall 32b into the interior cavity 60 of the upstream end 64 of each channel assembly 34 (see FIG. 4 and 5). A second series of ports 48 formed in sidewall 32b allow a quantified amount of heated air to flow from the outlet side of intake manifold 36 into the interior cavity 84 of the upstream facing leading edge 50 of extension 89 of each of the channel assemblies 34 (see FIG. 4 and 5).

FIG. 6 shows the structural details of adjacent channel assembly members 34a and 34c. Particle-laden incoming air 52 enters the separator 10 along an inlet passageway 47 formed by oppositely facing walls of adjacent channel assemblies 34a and 34c. Passageways 47 include a turn and have an air inlet 21 and an air outlet 23, said air outlet 23 being generally aligned with the air inlet 21. Each of the channel assemblies 34 comprises a curved forward edge 64 adjacent the air inlet 21 and a reversely curved rear edge 89 adjacent the air outlet 23. Sidewall 62 joins curved forward edge 64 to a generally planar intermediate wall 78 positioned in parallel arrangement with a dimpled center wall 80. A sidewall 92 connected to rear edge 91 is also positioned in parallel arrangement with center wall 80, forming thereby a sandwich structure comprised of walls 78, 80 and 92. Another side wall 66 joins wall 92 to forward edge 64. Side walls 66 and 92 join in a section 68 which includes a bend 67. A wall 89 extends from the rear edge 91 toward the interior of the passageway 47 and terminates in upstream facing airflow dividing edge 50. Edge 50 is displaced from the wall section 68 of the adjacent channel assembly 34 to provide a gap through which air flows from the inlet 21 to the outlet 23 (See arrow 54) of passageway 47.

Between edge 50 and sidewall 92, a particle collection chamber 58 is formed within wall 89, rear edge 91 and side wall 92. A trap wall 94 partially closes chamber 58 and comprises a slanting wall which joins inner side wall 78 at juncture 95.

The other end of the slanting wall 94 terminates in a lip 96, which is displaced from the inner wall 90 of the chamber to form a restrictive entrance throat 99, whereby particle laden air (See arrows 56) will enter the particle collection chamber 58 under turbulent conditions. About 90 percent of the volume of incoming air in each inlet passage is delivered as clean air 54 to the outlet passage of the separator. Some 10 percent of the incoming air 52 flows along with the dirt particles in airstream 56 into particle collection chamber 58 of each channel assembly 34.

Heated gas delivered via sidewall ports 46 from the intake manifold 36 (see FIG. 5) enters into closed cavity 60 of each channel assembly 34 (cavity 60 is shown in FIG. 6). Cavity 60 is bounded by inner wall 62 and outer wall 66 which join at curved edge 64 and further by inner wall 78 connected to inner wall 62 and outer wall 92 which is joined to outer wall 66 by the bend section 68. Walls 78 and 92 are sandwiched together with dimpled center wall 80 therebetween to close the downstream end of cavity 60.

A baffle plate 70a–70b acts as a separator within cavity 60 and serves to distribute the heated gas over all faces of the entire inlet end of each channel assembly 34. The manner in which baffle plate 70a–70b accomplishes the distribution of heated gas is best shown by reference to FIG. 7. Hot gas 71 is delivered through sidewall 32b via port 46. A notch in that portion of baffle plate 70a which is nearest sidewall 32a allows hot gas to leave, via port 74, that portion of the interior cavity 60 which is nearest forward curved wall 64. The interior cavity 60 is also bounded by sidewalls 32a and 32b, and is divided into three portions by baffle plate 70a and 70b. As shown in FIG. 7, warm gas entering via port 74 must travel the width of the channel assembly 34 before it can exit via port 76. After exiting through port 76, the warm gas is within the third part of the interior chamber. This third part is bounded by housing sidewalls 32a and 32b, baffle plate 70b, transverse wall 68, intermediate wall 78 and dimpled center wall 80 (shown in cross section in FIG. 6).

Figure 10:
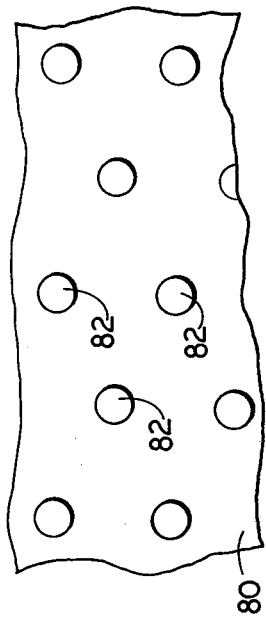
FIG. 10 is a fragmentary side view of the dimpled material depicted in FIG. 9, showing the staggered arrangement of the dimples which enables spent hot air to be discharged into the scavenge chamber.
Figure 9:
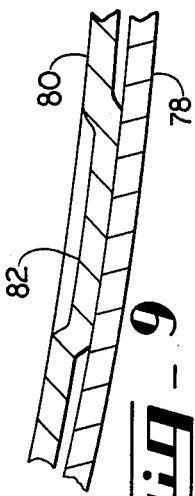
FIG. 9 is an enlarged cross sectional view of one of the dimples stamped in the spacer material used in the double wall construction of the channel assembly of this invention.

There is a small duct 100 between intermediate wall 78 and dimpled center wall 80. The spacing is achieved by the dimpling arrangement shown in FIG. 9 and 10. Small indentations 82 are formed in center wall 80. These dimpled indentations serve to space walls 78 and 80 apart a prescribed amount such that the hot gas entering into the channel assembly through port 46 bleeds out slowly downstream through duct 100 into particle collection chamber 58 at outlet 83. Specifically, the spacing between walls 78 and 80 caused by dimples 82 serves to bleed out the hot gas from the hollow interior of cavity 60 into chamber 58.

The airstream divider edge 50 and the interior of the particle collection chamber 58 are kept ice-free in a similar way. Hot gas is injected into interior chamber 84 (see FIG. 6) via ports 48 (see FIG. 5). Baffle plate 86 forces the hot gas coming in at port 48 to travel the width of the inner side of the edge 50 before it can exit through port 88 (see FIG. 8) into the second stage chamber 87. Spaced apart walls 89 and 90 form a second duct 100 to allow the hot gas in this second interior chamber to gradually bleed out downstream into particle collection chamber 58 (see FIG. 6). The spacing between walls 89 and 90 is achieved by forming dimples in the wall 90 material in the same manner as shown in the earlier discussed FIG. 9 and 10 descriptions.

The outlet end 23 of each channel assembly 34 is comprised of outer wall segments 89, 91 and 92. Dimpled wall segment 90 forms a duct 100 between walls 89 and 90 to heat the walls of particle collection chamber 58.

Slant wall portion 94 is effectively connected at one end 95 to intermediate wall portion 78. At its other end, slanting wall portion 94 terminates in a lip 96, the space between lip 96 and inner wall 90 forming a restrictive entrance throat therebetween, whereby particle-laden air enters particle collection chamber 58 under generally turbulent conditions.

The air and dirt captured in the particle collection chambers 58 will remain in a state of turbulence. This is due to the placement of the entrance to the chamber along one edge. Reference to FIGS. 3, 4 and 5 shows that the contaminated air in the particle collection chambers 58 is exhausted through ports 38 and 40 formed, respectively, in sidewalls 32a and 32b. Supplementary scavenge manifold 27 collects all of the contaminated air exiting through ports 40. Scavenge manifold 26 collects the contaminated air exiting through ports 38. By using sidewall ports in both ends of each particle collection chamber, there are no dead zones where dirt and water can accumulate. Supplementary scavenge manifold 27 communicates with manifold 26 by means of port 42 which forms the entrance to the interior of channel assembly 34a, the other end of which connects through port 44 into the main scavenge manifold. Thus, all contaminated air is eventually drawn through the outlet duct of scavenge manifold 26 and delivered through exhaust duct 24 to a sump by the reduced pressure created by scavenge pump B.

The manner in which hot air from the de-icing equipment is delivered to each particle collection chamber also helps to keep the contaminated air within each chamber 58 in a state of turbulence. Reference to FIG. 6 shows that hot air from the de-icer enters chamber 58 through both outlets 83 and 93. As viewed in FIG. 6, air entering collection chamber 58 past outlets 83 and 93 and lip 96 has a velocity component which tends to make the air within the chamber swirl in a counter-clockwise direction. This swirling motion helps to keep the dirt and moisture particles in suspension until they can be exhausted through the scavenge manifold.

Injection of warm air from the de-icing equipment into each particle collection chamber has another benefit. Mixing of the still-warm anti-icing air with the scavenge air effectively protects the collection chambers, the scavenge manifolds, the exhaust ducts and the scavenge air pumping system from blockage by ice. The flow of warm air through the scavenge end of the separator keeps all water condensates above the freezing point and is therefore an important operational adjunct during adverse meteorological conditions.

It is apparent that numerous and varied arrangements may be devised in accordance with these principles by those skilled in the art without departing from the spirit and scope of the invention.

We claim:

1. A particle separator of the anti-icing type useful for separating and removing foreign particles from an airstream supplied to an engine air intake passage, said particle separator comprising:
   a housing mounted on said engine, said housing having an open interior with an inlet and an outlet through which air is permitted to pass, said outlet being in communication with said engine air intake passage;
   a plurality of channel assemblies mounted in parallel side-by-side relationship within the open interior of said housing and extending from the inlet to the outlet of said housing, said channel assemblies being formed such that adjacent assemblies divide the open interior of said housing into separate passageways each having a turn intermediate its length, said passageways extending from the inlet to the outlet of the housing, said turn of the passageways causing an inertial separation of the foreign particles in the airstream;
   each of said channel assemblies being constructed of a plurality of joined walls and further having a projection at its outlet end extending upstream and into the adjacent passageway formed thereby to form a particle collection chamber, said chamber being located downstream of the turn and having an upstream facing opening defined by the walls of the channel assembly and an air dividing upstream facing edge of the projection;

said walls of each of said channel assemblies forming a first cavity within the inlet end of the channel assembly and a first duct within the assembly connecting said first cavity with the particle collection chamber;

said walls also forming a second cavity within the airstream dividing edge and a second duct within the projection connecting said second cavity with the particle collection chamber;

a source of heated air connected to the particle separator housing;

an intake manifold mounted on the housing to receive the heated air and distribute said air to the first and second interior cavities of each of the channel assemblies, said heated air flowing through the first and second ducts to the particle collection chambers; and a scavenge manifold mounted on said housing in communication with each of the particle collection chambers for receiving and exhausting the foreign particles and heated air therefrom.

2. A particle separator as defined in claim 1 wherein each of the channel assemblies includes a baffle plate disposed in each of said first and second cavities, and formed to cause the heated air to circulate throughout the cavities.

3. A particle separator as defined in claim 1 further comprising a blower operatively associated with the scavenge manifold to create a reduced pressure therein in order to facilitate the removal of foreign particles and heated air from the particle collection chambers.

4. A particle separator as defined in claim 1 wherein the first and second ducts of the channel assemblies are disposed to introduce the heated air from the first and second cavities into the particle collection chambers in a manner which fosters turbulence in said chambers sufficient to maintain the foreign particles in suspension within the chambers.

* * * * *